Nov. 12, 1940.  L. W. MULFORD  2,221,649
BUILDING BLOCK
Filed Aug. 5, 1939
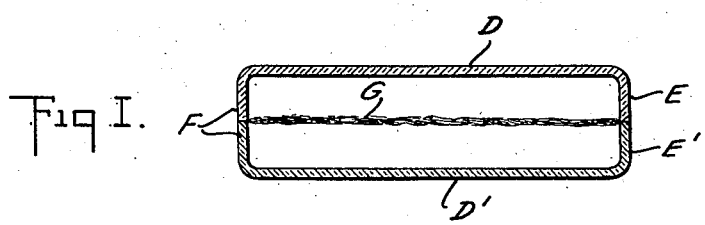
Fig I.
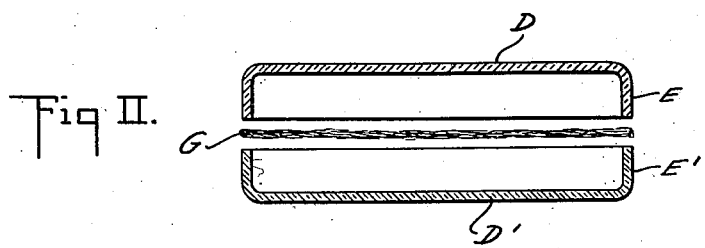
Fig II.
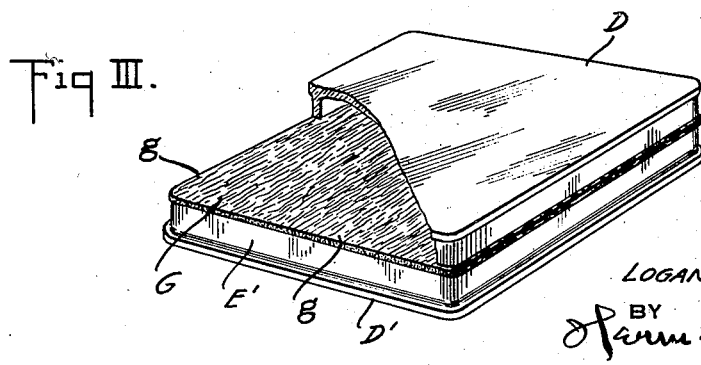
Fig III.
INVENTOR
LOGAN WILLARD MULFORD
BY
ATTORNEY Patented Nov. 12, 1940

2,221,649

UNITED STATES PATENT OFFICE 2,221,649

BUILDING BLOCK

Logan Willard Mulford, Kew Gardens, N. Y.

Application August 5, 1939, Serial No. 288,526

7 Claims. (Cl. 72—41)

This invention relates to building blocks for use in structures such as glass roofs, walls, partitions and the like. More particularly it relates to such blocks or cells constituting insulating units which preferably are formed with a partial vacuum, and which are so constructed as to reduce the transmission of heat and glare of the penetrating light. By my construction the heat rays of the sun are to some extent intercepted or interrupted in the transmission through my block by some absorption and reflection, and light rays are diffused and to some small degree absorbed by deflections from the sun or daylight penetrating from one side of the walls, roof lights, or the like, thereby eliminating glare, protecting and making the light transmitted more restful to the eyes, thus providing an insulating block with additional heat and glare prevention not heretofore obtained with glass blocks as heretofore used in the art.

As set forth in my United States application for Letters Patent filed June 3, 1936, Serial No. 83,315, I disclosed the use of glass fiber in a light transmitting building block embodied in several ways, as well as the use of glass fiber in matted or loose form between two layers of glass in a roof light structure, or the like. In said application I set forth that such construction will permit the passage of light as required, but minimize the transmission of heat and glare, as from the sun, and likewise minimize the transmission of heat from the interior of a building at times when the outside air is lower in temperature, and that the structure of my block prevents or minimizes the glare from the sun through a transparent or translucent wall or roof structure. It also greatly reduces the liability of condensation by preventing the otherwise great difference in the temperature between the outside and inside surfaces of the faces of the block, which is especially pronounced in cold weather.

Providing my combination of glass fibre sheet in the sealed hollow block, and spaced from the faces of the block, protects the fibre for permanent uniform functioning of retarding, softening and diffusion of light rays and reducing the passage of heat through the block. In particular the glass fiber permits penetration of the light, while insulating in addition to the insulation effected by the structure due to the air pocket.

I have endeavored to provide such insulating glass blocks with glass of different characteristics such as infra ray glass, colored or other heat absorbing or light filtering glass,—on one or both faces of the block, and find that the principal effect, as herein involved, of absorbing or retarding the heat and reradiation, is effected with great advantage by the introduction of glass fiber or glass wool, and preferably in particular ways, and in combination with the other structural features or parts of the block unit.

While my invention may be embodied in various ways, and the block dimensions and other features of construction may be changed or varied, I prefer a structure in which a sheet, matted or woven, of glass fiber is secured in the block generally parallel and spaced out of contact with the plates forming the faces of the block transmitting light, though connected with the block rim.

Thus in my preferred form I provide two parts, each with a face of the block and rim portions integral with their edges, which are fused, soldered with metal, or welded together in order to complete the blocks, but before the fusing and completion of the construction of the unit, a suitably preformed layer of glass fiber is inserted and simultaneously fused or fastened preferably at the junction of the rim portions of the two preformed or partly processed sections that make up the block. Thus the layer or sheet of glass fiber or fabric is embodied permanently in the block by fusing or fastening around its edges with the rim portions, and provides a unitary structure within the partially evacuated air pocket of the block. It will be noted that to fuse the juxtaposed edges of the parts of the rim they are locally heated to the fusing point, and preferably the source of heat such as a flame is withdrawn and the pressing of the fusible edges in contact with the fiber sheet instantly heats the fibers of the sheet, in view of their physical character, so that the quick pressing of the block parts together causes a union at the junction of the rim parts with the fiber in the sheet. Thus in the formation there is no necessity of the direct application of heat to the fiber, and the heat transmitted from the fusing temperature of the more substantial body of glass at the contacting edges of the rim provides the necessary means for an airtight union.

The accompanying drawing illustrates the forms of my construction in which—

Figure I is a cross section of a block in which a median layer of matted or woven glass fiber or fabric is permanently combined, suspended between the transmitting face plates of the block;

Figure II is a cross section of a block in process of formation showing the two sections of faces and rimmed portions with the median glass fiber sheet in the position preceding the fusing or welding of the glass at the junction of juxtaposed rim edges; and Figure III is a perspective of a block, part fragmentary, showing the glass fiber sheet united with the rim edges and spaced from the block faces.

In the form of my block shown in section in Figs. I and II, I provide two block halves, each having a clear light transmitting face D and D', and integral with each of these faces a border E and E', at substantially right angles, which latter form the rim F of the block. When each half of the block comprising face D and part rim E,—and D' and part rim E',—are formed preferably by pressing the glass when in semi-molten condition, the two halves are held slightly separated, with the plate or face portions sufficiently cool to maintain their form, and a sheet of woven or matted glass fiber G is inserted between the two sections. With the edges of the rim parts E and E' properly heated, in order to fuse together, the two parts are pressed together so that the union of the rim parts is effected simultaneously with the uniting of the edge portion of the glass fiber sheet between the edges of the two parts of the rim.
This forms a complete sealing and a permanent binding on the fiber sheet between the rim parts, and the formation of the completed block being at temperatures adapted for fusing of the glass, involves the heating of the air in the space enclosed between the two sections, so that upon cooling the air is rarefied to the extent of producing a partial vacuum. It will be noted that by so forming my insulating and non-glare heat absorbing or retarding block, I require only a minimum amount of glass fiber by having it in the form of sheeting or fabric, and have the added advantage of suspending the entire glass fiber element of the block spaced between the light pervious or light transmitting faces of the block, and out of contact with the inner surfaces of such faces or face plates.

In Figure III is shown a block of slightly modified detail of shape of rim and face edges, which is a form I have used for some years as an insulating block for many installations of roof light structure, but in addition to that form I have here shown, in a fragmentary section of one corner of the block, the matted or fabric sheeting of glass G which overlies, at g the edge of one of the borders or rim parts E', indicating the manner in which it is combined in the finished block at this junction of the rims of the two block halves. This, and Figures I and II, clearly show how the glass fiber in suitable sheet form is held by its binding at the block rim in a position suspended out of contact with the inner surfaces of the block face plates.

It will be seen that, while I also planned to insert the glass fiber, for the purposes and advantages herein set forth, in air pockets formed in double glazed roof light constructions, as more particularly set forth in my application for Letters Patent filed June 3, 1936, heretofore identified, this application is addressed to the forms of my invention as originally set forth in said application, namely, a unitary hollow glass block, for walls, partitions, as well as roof lights or the like, which is hermetically sealed and therefore combines the advantages of a hollow light transmitting glass block with the additional advantages of protection of the glass fiber or wool in the air sealed pocket in predetermined position, and with the added advantages with respect to heat retarding and absorbing or reradiation and eliminating or minimizing glare of direct light rays impinging upon one of the light pervious faces.

As herein, and originally set forth in my application Serial No. 83,315, the glass fiber is preferably in sheet form, woven or matted, and extends preferably uniformly over the entire area equivalent to the light penetrable area of the face of the block. In the preferred form the sheet of glass fiber held by the rim suspended between the inner surfaces of the faces of the block enables me to determine the minimum or optimum thickness of the fiber in the block, and while it greatly reduces the amount of glass fiber required for each block, the character of the sheet and its thickness can be predetermined to meet the best conditions of diffusion of the light rays, as well as the prevention of any glare penetration, predetermined heat absorption or reradiation and heat retarding, as well as any other features needed for the production of the best characteristics of my block for its particular use and for the best conditions of economic production or manufacture.

While various forms of block, such as the dimensions and confirmation, may be required to best suit the ultimate use of the block, my construction is adaptable for embodiment in any such variations. As a finished product my hollow light and heat retarding block may be equally usable in walls and partitions, as well as glass roofs, or otherwise, although I may, if desired, embody the invention in particular forms and of varying light and heat characteristics for the particular ultimate uses. This might involve the question of walls being subject to sun rays on the outside, but at an oblique angle of incidence, while partition walls might only be subject to indirect sunlight or concentrated artificial light, so that blocks for particular purposes may vary in the amount of glass fiber which may be of various colors or quality of glass as to light or heat resistance or filtering. Also in the case of roof lights, or the like, many are subjected for a fair portion of a day, to direct or near normal impingement of intense sunlight, the glare of which must be corrected, minimized or eliminated, so that for such use it may require relatively greater amount, that is thickness, or a varied weave, matted or otherwise formed texture of the glass fiber sheet, or a variation in the quality or color of the glass fiber, in order to best produce the desired results, as well as for economy of production.

While this application involves per se my glass block for all purposes, it will be noted that the manufacture involves a method of production which requires a distinct additional element or features beyond anything heretofore needed or required in the normal manufacture of hollow glass blocks, such as are today made by the pressed glass method, as distinguished from the earlier blown blocks, which latter did not lend themselves to the production of a block with my invention. This method consists of the forming of two parts of a block, which may be of similar rim depth or different, and may take the form of one face with the border integrally formed to constitute substantially the entire rim of the finished block, as particularly set forth in another of my patent applications now pending. Such embodiment, a modification of the border parts, may permit the securing of the glass fiber sheet close to one of the light penetrable faces or bulged away, and provide an additional factor of spacing between fiber sheet and the surface of one of the faces of the block to better meet conditions of heat retarding glare or heat absorption. In some forms I may have one face of my unit flat or formed, and of suitable material, to meet the decided direct light penetration, while the other side of the block may be greatly varied in its conformation. I may even have a globe effect on what would be the inside of the underside of a roof light, and it may be formed for lateral light wave distribution. Likewise the intervening light or heat affecting fiber sheet may be flat or variously formed for lateral or other particular light distribution, while still providing the heat control characteristics as hereinbefore set forth.

The method of production involves the pressed formation of two sections, or a trough section and a plate, the heating of the rim edges to a plastic point for fusing, the quick insertion of the fiber sheet between the two block parts, for positioning of the fiber sheet around the edges of the rim part, and the quick pressing together of the two block parts in order to fuse the rim edges and the glass fiber sheet rigidly together,— thus forming the complete block, hermetically sealed. On account of the temperature of the inclosed air at the time of finishing the union, there is a resultant partial vacuum when the block has cooled to the normal temperature under which it is thereafter used, as an article of commerce.

It will be understood that many variations may be made in the construction, variations in dimensions and forms and they are not necessarily limited to blocks as shown rectangular, as to the light penetrable faces, and variations in the material both as to the portions embodying the rigidity and strength of the block, but also formations and character of the glass fiber, as well as the quality and texture.

What I claim and desire to secure by Letters Patent is:

1. A building block comprising a hollow, insulating, light transmitting cell, having opposed light penetrable faces rigidly connected by a continuous rim forming an hermetically sealed air pocket, glass fiber in a sheet formation permanently confined within said block, and spaced from the interior surface of at least one face of the block, and solidified around its edges with the rim of the block.

2. A structural block capable of transmitting light without glare and minimizing transmission of heat, having two light penetrable faces held in rigid, spaced relationship by a rim forming an hermetically sealed air pocket, and a translucent fiber sheet in said air pocket firmly supported between the faces of said block, said sheet being substantially co-extensive with the light transmitting area of the block face.

3. A structural block capable of transmitting light without glare and minimizing transmission of heat, having two light penetrable faces held in spaced apart rigid and strong relationship by a rim, and a translucent fiber sheet firmly attached to and supported by said rim between the faces of said block, said sheet being substantially co-extensive with the light transmitting area of the block, said block being hermetically sealed and partially evacuated.

4. An insulating, hollow, glass, structural block, one side of which comprises a light penetrable face having an integral glass rim portion projecting therefrom, a glass fiber sheet substantially of like area with the light penetrable area of the face of said block, sealed to said rim, and a second light transmitting block member enclosing said glass fiber sheet and having permanently sealed connection with said rim so as to provide an hermetically sealed partial vacuum block with the glass fiber sheet between the light penetrable faces thereof.

5. An insulating hollow glass building block having its two glass light penetrable faces separated by a glass rim consolidated with and spacing them, and a glass fiber sheet formation supported by permanent attachment to the rim in spaced relation to the inner surfaces of the block faces.

6. An insulating hollow glass building block formed of two parts, each part embodying one of the light pervious faces of the block and integrally a peripheral rim adapted to form a part of the rim of the finished block, a glass fibre sheet generally parallel with the faces of the block and having its border extending between the juxtaposed edges of the two rim parts, a fused seam at the junction of the edges of the rim parts embodying the fused border of the fibre sheet.

7. A glass block comprising a pair of opposing similar rectangular cup sections opening toward each other, and a sheet of glass fibre between the opposing edges of the sections, all secured rigidly together at said edges in sealing relation.

LOGAN WILLARD MULFORD.